(No Model.)
W. C. MARR.
COMBINED FLOUR BOX AND SIFTER.
No. 324,859. Patented Aug. 25, 1885.
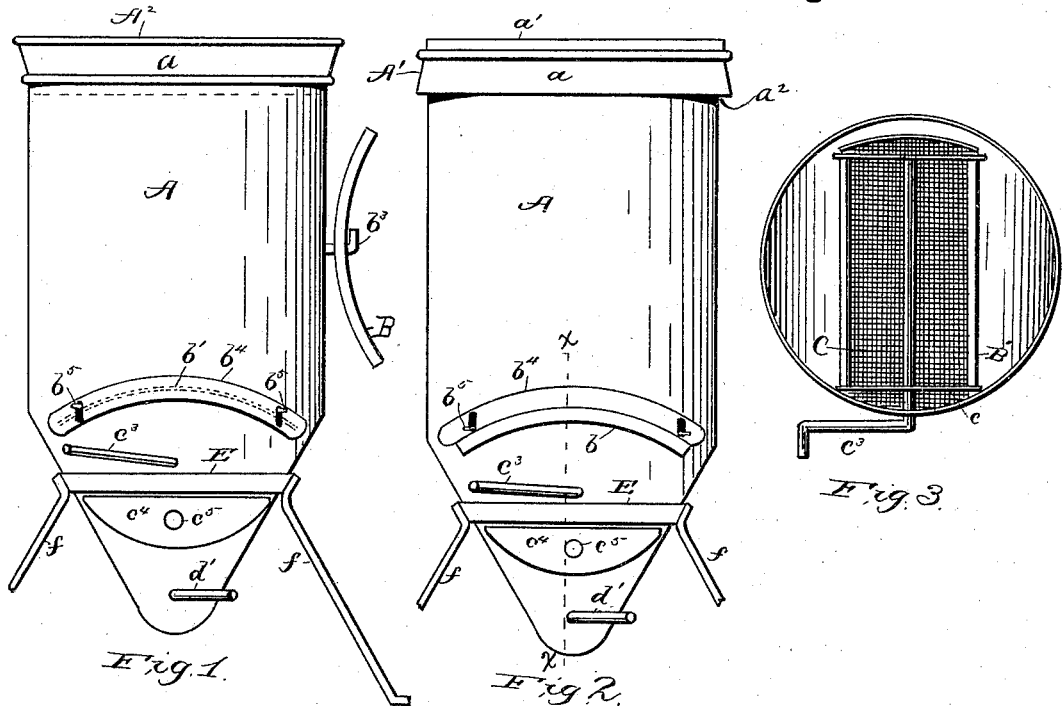
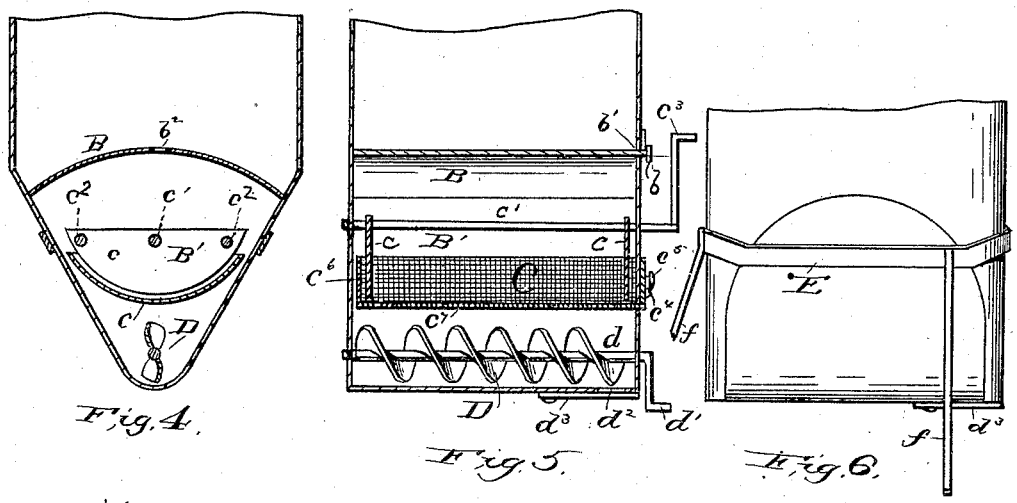
Witnesses
Wm. A. Rosenbaum
H. A. Daniels
Inventor
William C. Marr
By W. Burris
Atty.

UNITED STATES PATENT OFFICE.

WILLIAM C. MARR, OF ONAWA, IOWA.

COMBINED FLOUR BOX AND SIFTER.

SPECIFICATION forming part of Letters Patent No. 324,859, dated August 25, 1885.

Application filed December 1, 1884. (No model.)

*To all whom it may concern:*

Be it known that I, WILLIAM C. MARR, a citizen of the United States of America, residing at Onawa, in the county of Monona and State of Iowa, have invented certain new and useful Improvements in a Combined Flour Box and Sifter, of which the following is a specification, reference being had therein to the accompanying drawings.

My invention relates to flour and meal boxes and sieves, and consists of the construction and combination of the parts, as hereinafter fully set forth and claimed.

In the accompanying drawings, Figure 1 is a front elevation showing the removable partition withdrawn and suspended at the side. Fig. 2 is a front elevation with the removable partition inserted in the case. Fig. 3 is a top view without the cover and removable partition. Fig. 4 is a section of the lower portion of the case across the removable partition, the agitator, the sieve, and conveyer. Fig. 5 is a vertical section of the lower part of the case on line $x\,x$ of Fig. 2. Fig. 6 is a side elevation of the lower portion case, showing the supporting-frame, legs, &c.

A designates the external case, made of any suitable material, provided with the cover $A'$ and the lid $A^2$. The cover $A'$ is formed, as shown, with the double rims $a\,a'$, the rim $a$ being made flaring to extend over the top of the case, as shown in Fig. 2 of the drawings, for nesting the cover and box together for transportation. This rim $a$ is extended to a sufficient width to form a pan, $a^3$, of suitable depth, in which the flour may be mixed and the dough worked, and in which bread, cakes, or pies may be kept; and when thus used the cover is held upon the box by the short rim $a'$, and the pan $a^2$ may be covered by the lid $A^2$. Two of the sides of the lower portion of the case are drawn inward, forming the contracted chamber, in which are located the agitator, the sieve, and the conveyer, as shown, and hereinafter fully described.

B designates a movable partition, the body of which is formed of a single sheet of tin, or other suitable material sufficiently thin to be readily inserted through the flour in the box. This partition is curved upward to allow the agitator to be inverted when required, and its outer end is provided with a flange, $b$, wide enough to cover the slot $b'$, formed in the front wall of the box, to admit the partition, which is made the requisite width and length to fit closely against the walls of the box, for the purpose of completely cutting off the flour from descending to the sieve below when required. The partition is provided with a hole, $b^2$, to receive the hook $b^3$, attached to the side of the box for holding the partition when not in use. When this partition is withdrawn, the slot $b'$ is inclosed by the cover $b^4$, having at each end a slot, $b^5$, to receive the pins by which the cover is held in place. When the partition is inserted, the cover $b^4$ is raised, as shown in Fig. 2, and when the partition is withdrawn the cover drops down into the position shown in Fig. 1, inclosing fully the slot $b'$.

The agitator $B'$, located above the sieve, is formed in any suitable manner. The drawings show an agitator formed of the half-disks $c\,c$, attached to the central rod, $c'$, and the side rods, $c^2\,c^2$. The central rod is extended at each end through the walls of the box, and one end is provided with a crank, $c^3$, for oscillating the agitator over the sieve.

The sieve C may be of any suitable material and of any desired form. The drawings represent the sieve made in the form of a drawer, having its front, $c^4$, with a pull or knob, $c^5$, a back, $c^6$, and sides and bottom $c^7$, made of wire cloth, properly attached to the front and back. The edges of the sides may be bound by or attached to strips of tin, or other suitable material, to give these edges the requisite firmness and straightness, the sieve being made the requisite width and length to fit closely against the walls of the box to prevent the flour from passing around the sieve.

D is a worm-conveyer formed on a central rod or shaft, $d$, the ends of which are extended through and have their bearings in the end walls of the lower portion of the case, and one end of the rod is provided with the crank $d'$. This conveyer is made to fit closely and revolve freely within the long narrow chamber at the lower portion of the case. At the front of this chamber an opening, $d^2$, is formed in the bottom wall of the case to allow the sifted flour to descend to a receptacle below. The opening may be closed by a pivoted or sliding plate, $d^3$. The upper and lower portions of these cases may be made of such size and shape as that in transportation two or more of the boxes may be nested closely together.

The box is supported upon a detachable frame, E, made the requisite size to receive and fit the lower portion of the case, and this frame is provided with legs $f$, the upper portions of which may be formed to fit in sockets formed on or attached to the frame, so as to allow the legs to be readily detached for transportation.

This combined box and sieve may be made any required size to be easily handled and placed in the pantry or in any other convenient position. The conveyer may be dispensed with, and, if preferred, the chamber below the sieve may consist of a pivoted or hinged box, or a drawer, constructed and arranged to contain and afford ready access to the sifted flour.

When the removable partition is inserted in place, the upper portion of the box forms a convenient and well-protected receptacle for flour or meal.

By withdrawing partly or entirely the removable partition the required quantity of flour is allowed to descend upon the sieve. Then the agitator is oscillated by means of the crank $c^3$, causing the flour to pass through the meshes of the sieve into the conveyer-chamber; and when flour is wanted for use a receptacle is placed under the opening $d^2$, the cover $d^3$ is removed, and by turning in the right direction the crank of the conveyer the sifted flour is conveyed to and passes out of the opening into the receptacle below.

When the partition B is withdrawn from the case, it is placed and kept readily accessible on the hook $b^3$ at the side of the box.

When it may be desirable to remove the bran, &c., which may have accumulated in the sieve, the partition B, if not already in place, is inserted, cutting off the descent of flour to the sieve, and the remaining flour in the sieve being caused to pass through it, the agitator is inverted, so as to place the disks $c$ out of the way of the sieve-drawer, which is then withdrawn and the bran removed and the drawer returned to its place.

What I claim as new, and desire to secure by Letters Patent, is—

1. A combined flour box and sieve, comprising the casing A, provided with the slot $b'$, the adjustable cover $b^4$, arranged to close the slot, the removable partition B, adapted to be inserted through the slot and to fit closely against the walls of the box, the sieve-drawer C, constructed to fit closely against the walls of the box, and the agitator B', arranged above the sieve, all substantially as and for the purposes described.

2. A combined flour box and sieve, comprising the casing A, having the slot $b'$, the adjustable cover $b^4$, arranged to close the slot, the removable partition B, adapted to be inserted through the slot and fit closely against the walls of the box, the sieve-drawer C, constructed to fit closely against the walls of the box, the agitator B', arranged above the sieve, and the worm-conveyer D, arranged in a chamber below the sieve, substantially as and for the purposes described.

In testimony whereof I affix my signature in presence of two witnesses.

WILLIAM C. MARR.

Witnesses:
  G. W. MOBOY,
  J. W. MCMACKEN.